United States Patent [19]

Antos et al.

[11] Patent Number: 4,463,104

[45] Date of Patent: Jul. 31, 1984

[54] PLATINUM GROUP AND PHOSPHORUS CONTAINING CATALYST COMPOSITION FOR HYDROCARBON CONVERSION

[75] Inventors: George J. Antos, Bartlett; Tai-Hsiang Chao, Des Plaines, both of Ill.

[73] Assignee: UOP Inc., Des Plaines, Ill.

[21] Appl. No.: 408,544

[22] Filed: Aug. 16, 1982

Related U.S. Application Data

[63] Continuation-in-part of Ser. No. 324,302, Nov. 23, 1981, Pat. No. 4,367,137, which is a continuation of Ser. No. 212,780, Dec. 4, 1980, abandoned.

[51] Int. Cl.$^3$ .............................................. B01J 27/14
[52] U.S. Cl. .................................. 502/213; 208/138; 208/139; 502/230
[58] Field of Search ................................ 252/435, 437

[56] References Cited

U.S. PATENT DOCUMENTS

| | | | |
|---|---|---|---|
| 2,349,827 | 5/1944 | Mattox | 196/50 |
| 2,441,297 | 5/1948 | Stirton | 260/668 |
| 2,890,167 | 6/1959 | Haensel | 208/139 |
| 3,224,831 | 12/1965 | Stephens | 23/2 |
| 3,227,658 | 1/1966 | Myers et al. | 252/433 |
| 3,642,658 | 2/1972 | Allum et al. | 252/431 |
| 3,706,815 | 12/1972 | Alley, Jr. | 260/683.65 |
| 3,965,040 | 6/1976 | Kobylinski et al. | 252/437 X |
| 4,046,672 | 9/1977 | Pollitzer et al. | 208/139 |
| 4,122,039 | 10/1978 | Kobylinski et al. | 252/437 X |

*Primary Examiner*—Delbert E. Gantz
*Assistant Examiner*—William G. Wright
*Attorney, Agent, or Firm*—James R. Hoatson, Jr.; Kenneth J. Pedersen; William H. Page, II

[57] ABSTRACT

A new catalyst composition for converting hydrocarbons is disclosed. Also disclosed is a method for making the catalyst. The catalyst comprises a platinum group component and a phosphorous component with a porous support material. The catalyst is made by compositing a platinum group component with a porous support material and then contacting that composite with phosphorus or a compound of phosphorus. In a preferred embodiment of the invention a catalyst comprising platinum, phosphorus and chlorine with alumina is utilized in the catalytic reforming of hydrocarbons boiling in the gasoline range to produce a high octane reformate suitable for gasoline blending or a high aromatics content reformate suitable as a petrochemical feedstock.

35 Claims, No Drawings

PLATINUM GROUP AND PHOSPHORUS CONTAINING CATALYST COMPOSITION FOR HYDROCARBON CONVERSION

CROSS-REFERENCE TO RELATED APPLICATIONS

This application is a continuation-in-part of pending prior application Ser. No. 324,302 filed Nov. 23, 1981 now U.S. Pat. No. 4,367,137 entitled HYDROCARBON CONVERSION WITH AN ACIDIC MULTIMETALLIC CATALYTIC COMPOSITE which is a continuation of application Ser. No. 212,780 filed Dec. 4, 1980, now abandoned, likewise entitled and now abandoned.

BACKGROUND OF THE INVENTION

1. Field of the Invention

This invention pertains to the reforming of hydrocarbons in the presence of a catalyst composite. This invention also pertains to a new catalyst composition containing a platinum group component and a method for making the catalyst. Pertinent U.S. patent classification for the subject matter of this invention is Class 208, Subclasses 64, 65, 133 and 143, and Class 252, Subclasses 461 and 466 PT—reforming of hydrocarbons with noble metal-containing catalysts.

The catalyst of this invention comprises a platinum group component and a phosphorous component with a porous support material. The catalyst is made by compositing a platinum group component with a porous support material and then contacting that composite with phosphorus or a compound of phosphorus. The catalyst is particularly useful in the catalytic reforming of hydrocarbons boiling in the gasoline range to produce a high octane reformate suitable for gasoline blending or a high aromatics content reformate suitable as a petrochemical feedstock.

2. Description of the Prior Art

U.S. Pat. No. 2,349,827 discloses using the phosphates of metals like aluminum and magnesium, for example, as catalysts for reforming hydrocarbons. This patent, however, does not disclose utilizing platinum as a catalytic metal as is required in our invention.

U.S. Pat. No. 2,441,297 discloses adding an aluminum salt of a pentavalent phosphorous compound to a catalyst support material for improved heat stability and catalyst life in a wide variety of reactions, including reforming of hydrocarbons. The preferred phosphorous compound is aluminum orthophosphate which is precipitated with the preferred alumina support. This patent, however, does not disclose compositing a platinum group component with a porous support material and then contacting that composite with phosphorus or a compound of phosphorus as is required in our invention.

U.S. Pat. No. 2,890,167 discloses a reforming catalyst comprising a metal or mixtures of metals from Group VIII of the periodic table, a compound of phosphorus and a cracking component. The cracking component is the support material which may be at least two refractory inorganic oxides together or a refractory inorganic oxide and halogen. This patent discloses broadly that the phosphorous compound may be added with the other catalytic components in any manner, but it specifically recites only two methods, namely; impregnating the support material with a solution of a phosphorous compound, and compositing the phosphorous compound with the cracking component support material by cogelation or coprecipitation, for example, when the cracking component is being prepared. This patent does not disclose compositing a platinum group component with a porous support material and then contacting that composite with phosphorus or a compound of phosphorus as is required in our invention.

U.S. Pat. No. 3,224,831 discloses broadly treating a porous support material and platinum composite with a compound of phosphorus selected from the group consisting of the acids of phosphorus and ammonium phosphate. Catalysts prepared by the method disclosed in this patent are useful in the catalytic oxidation of hydrocarbon and carbon monoxide constituents which are present in the exhaust gas of internal combustion engines. In this method, however, the sequence in treating the catalyst composite with the phosphorous compound is not critical as it is in our invention: according to this patent the support material can be first treated with the phosphorous compound and then that composite impregnated with the platinum solution; or, the support material can be impregnated with a common solution of the phosphorous compound and the platinum compound; or, the support material can be first impregnated with the platinum solution and then that composite treated with the phosphorous compound. Also in the method of this patent the phosphorus-treated support material and platinum composite is subjected to an air oxidation at temperatures from 300° to 1000° C. before being subjected to a hydrogen reduction step. In our invention, on the other hand, the phosphorus-treated support material and platinum group component composite is not subjected to an intermediate oxidation step before being reduced.

U.S. Pat. No. 3,227,658 discloses contacting a catalyst containing a Group VIII metal and alumina at elevated temperatures with an activating agent selected from the group consisting of the volatile chlorides and bromides of boron and phosphorus and the mixed chlorobromides thereof. The catalysts disclosed in this patent are useful in the isomerization of hydrocarbons. This treatment with the gaseous boron or phosphorous halides adds halide to the catalyst for increased isomerization activity. The activating treatment comprises contacting the catalyst with the gaseous activating agent at temperatures in the range of 700° to 1500° F., preferably 1000° to 1300° F., for a period of at least 0.1 hour and up to 10 hours or more. After this treatment additional activity may be obtained or these catalysts by subliming a small amount of aluminum chloride or aluminum bromide onto the catalyst to add even more halide. In our invention, on the other hand, it is not necessary to contact the support material and platinum group component composite with chlorides or bromides of phosphorus, nor is it necessary to treat the catalyst with the phosphorous component at such high temperatures.

U.S. Pat. No. 3,642,658 discloses contacting a Group VIII metal surface, especially nickel or platinum, with a Group V compound of the general formula $X_3M$, where X is an organic radical, a hydrogen or a halogen atom and M is an atom of phosphorus, arsenic or antimony so that the atomic ratio of the Group V component to the Group VIII component is from 0.01 to 0.5. The catalysts disclosed in this patent are useful in the hydrogenation of diolefins to mono-olefins. In the catalyst of our invention, on the other hand, the phosphorus to platinum group component atomic ratio is greater than 0.5; preferably this ratio is from about 0.5 to about 20.0.

U.S. Pat. No. 3,706,815 discloses depositing the chelates of a Group VIII noble metal and a polyphosphoric acid on a porous support material. The catalysts disclosed in this patent are useful in the isomerizing of hydrocarbons. This patent does not disclose compositing a platinum group component with a porous support material and then contacting that composite with phosphorus or a compound of phosphorus as is required in our invention.

BRIEF SUMMARY OF THE INVENTION

This invention pertains to a new catalyst composition for reforming hydrocarbons and to a process for reforming hydrocarbons using the new catalyst. This invention also pertains to a method for making the new catalyst. The catalyst comprises a platinum group component and a phosphorous component with a porous support material. The catalyst is made by compositing a platinum group component with a porous support material and then contacting that composite with phosphorus or a compound of phosphorus. The catalyst is particularly useful for reforming hydrocarbons boiling in the gasoline range to produce a high octane reformate suitable for gasoline blending or a high aromatics content reformate suitable as a petrochemical feedstock. Addition of the phosphorous component according to our invention provides a platinum group metal-containing reforming catalyst with improved selectivity characteristics as exhibited by increased $C_5+$ yields of constant octane reformate product.

DETAILED DESCRIPTION OF THE INVENTION

Heterogeneous catalysis practice, that is, catalyzing reactions of liquid or gaseous reactants with solid catalysts, is important to industry. For many years persons skilled in the art of hydrocarbon conversion, for example, have endeavored to discover and develop improved heterogeneous catalysts. Generally, these persons have been highly trained in one or more of a wide variety of disciplines, including, for example, organic and inorganic chemistry, solid state and surface physics, ceramics, metallurgy and chemical engineering. Notwithstanding this high level of skill in the art, hydrocarbon conversion with heterogeneous catalysts continues to be "a vast and confusing field replete with an enormous quantity of perhaps significant but empirical facts intermixed with perhaps useful theories." C. N. Satterfield, *Heterogeneous Catalysis in Practice*, preface (1980).

Consequently, significant contributions to the art of heterogeneous hydrocarbon conversion catalysis have generally resulted from empirical discoveries and developments rather than from theoretical extrapolations.

We have discovered a new catalyst composition comprising a platinum group component and a phosphorous component with a porous support material. The catalyst is made by compositing a platinum group component with a porous support material and then contacting that composite with phosphorus or a compound of phosphorus. In the final catalyst composite of our invention the phosphorous to platinum group component atomic ratio is greater than 0.5; preferably this atomic ratio is from about 0.5 to about 20.0. After our support material and platinum group component composite is contacted with phosphorus or a compound of phosphorus the final catalyst is reduced prior to its first use in the reforming of hydrocarbons without an intermediate oxidation step. Preferably the final catalyst is reduced with a substantially pure and dry hydrogen stream at a temperature of about 400° to about 1600° F. and a gas hourly space velocity (GHSV—calculated on the basis of the volume of the gas contacted with the catalyst per hour at standard conditions divided by the bulk volume of the catalyst particles) of about 10 to 10,000 for about 0.5 to 10 hours. Preferably the catalyst contains, on an elemental basis, about 0.01 to about 5 wt. % platinum group component and about 0.01 to about 5 wt. % phosphorus. Preferably the catalyst also contains a halogen component. The catalyst may also contain, on an elemental basis, about 0.01 to about 10 wt. % sulfur.

Optionally, the catalyst may also contain other, additional metals which act alone or in concert as catalyst modifiers to improve catalyst activity, selectivity or stability. For reforming of hydrocarbons some well-known catalyst modifiers include antimony, arsenic, beryllium, bismuth, cadmium, calcium, chromium, cobalt, copper, gallium, germanium, gold, iron, indium, lead, lithium, manganese, molybdenum, nickel, rhenium, scandium, silver, tantalum, tin, thallium, titanium, tungsten, uranium, zinc, and zirconium.

The catalyst of our invention is useful for the conversion of hydrocarbons, especially for the reforming of naphtha feedstocks boiling in the gasoline range. Typically these feedstocks will have an initial boiling point of from about 50° to about 150° F. and an end boiling point of from about 325° to about 425° F. Reforming reactions include dehydrogenation of naphthenes to aromatics, dehydrocyclization of paraffins to aromatics and hydrocracking and isomerization of naphthenes and paraffins, and the like reactions, to produce an octane-rich or aromatic-rich product stream. Reforming conditions include a temperature of about 500° to about 1100° F., a pressure of about 50 to 1000 psig, a liquid hourly space velocity (LHSV—calculated on the basis of liquid volume of the chargestock contacted with the catalyst per hour at standard conditions divided by the bulk volume of the catalyst particles) of about 0.1 to about 10 and a mole ratio of hydrogen to hydrocarbon of from about 0.5:1 to about 20:1.

Our invention, then, is a new catalyst composition comprising a platinum group component and a phosphorous component with a porous support material, and the method of its manufacture. Also, our invention is the use of this new catalyst in a process for converting hydrocarbons, especially, reforming of hydrocarbons boiling in the gasoline range.

To be commercially successful a reforming catalyst must satisfy three essential requirements, namely, high activity, high selectivity and good stability. Activity is a measure of the catalyst's ability to help convert reactants into products at a specified severity level where severity level means the reaction conditions used, that is, the temperature, pressure, contact time and presence of diluents such as hydrogen, if any. For reforming catalyst activity we measured the reactor heater temperature in degrees Fahrenheit required to maintain a target research octane number of 101.5 for the reformate product. Selectivity is a measure of the catalyst's ability to help produce a high amount of desired product or products relative to the amount of reactants charged or converted. For catalyst selectivity we measured the $C_5+$ yield, or the amount of hydrocarbons with 5 or more carbon atoms recovered, in liquid volume percent, relative to the total volume of the hydrocarbon charged. Stability means the rate of change with time of the activity and selectivity parameters—the smaller rate implying the more stable catalyst.

There is a considerable demand for new reforming catalysts with improved activity, selectivity or stability characteristics. The catalyst of our invention, that is, a catalyst comprising a platinum group component and a phosphorous component with a porous support material, will help answer such demands. Addition of the phosphorous component according to our invention provides a platinum group metal-containing reforming catalyst with improved selectivity characteristics as exhibited by increased $C_5+$ yields of constant octane reformate product.

Regarding the platinum group component of our catalyst composite, it may be selected from the group of platinum or palladium or iridium or rhodium or osmium or ruthenium or mixtures thereof. Platinum, however, is the preferred platinum group component. We believe that substantially all of the platinum group component exists within the final catalyst composite in the elemental metallic state. Preferably the platinum group component is well dispersed throughout the catalyst composite. The platinum group component can be used in any catalytically effective amount, with good results being obtained with about 0.01 to about 5 wt. % platinum, for example, calculated on an elemental basis, of the final catalyst composite. Preferably the catalyst comprises about 0.4 wt. % platinum.

The platinum group component may be incorporated in the catalyst composite in any suitable manner such as by coprecipitation or cogelation or coextrusion, ion exchange or impregnation either before, while or after other catalytic components are incorporated. According to our invention, however, the platinum group component is composited with the porous support material before the phosphorous component is composited. The particular method of incorporating the platinum group component is not deemed to be an essential feature of this invention. The preferred method of incorporating the platinum group component is to impregnate the support material with a solution or suspension of a decomposable compound of a platinum group metal. For example, platinum may be added to the support by commingling the latter with an aqueous solution of chloroplatinic acid. Hydrochloric acid or nitric acid or other optional components may be added to the impregnating solution to further assist in dispersing or fixing the platinum group component in the final catalyst composite.

Regarding the phosphorous component of our catalyst composite, it may exist in any catalytically active form such as the element or as a compound of phosphorus. At this time we do not know the precise form of the phosphorous component. Preferably this phosphorous component is also well dispersed throughout the catalyst composite. The phosphorous component can be used in any catalytically effective amount, with good results being obtained with about 0.01 to about 5 wt. % phosphorus, calculated on an elemental basis, of the final catalyst composite. Preferably the catalyst comprises about 0.5 wt. % phosphorus.

For the catalyst of our invention, the platinum group component is first composited with the porous support material. Then, the porous support material and platinum group component composite is contacted with phosphorus or a compound of phosphorus to incorporate the phosphorous component on or in the catalyst composite. The phosphorous component may be incorporated with the porous support material and platinum group component composite in any suitable manner. The particular method of incorporating the phosphorous component is not deemed to be an essential feature of this invention. One method for incorporating the phosphorous component, for example, is to react white, yellow or red elemental phosphorus directly with the porous support material and platinum group component composite. A preferred method for incorporating the phosphorous component, however, is to impregnate the porous support material and platinum group component composite with a solution or suspension of a decomposable compound of phosphorus. Suitable phosphorous compounds for use in this impregnation method include hypophosphorous acid, dimethylphosphite, triphenylphosphine, cyclohexylphosphine, phosphorous trichloride, phosphoric acid, tributylphosphine oxide, tributyl phosphite, phosphorous tribromide, phosphorous triiodide, phosphorous oxychloride and the like compounds. The preferred impregnation solution comprises an aqueous solution of hypophosphorous acid.

Regarding the porous support material of our catalyst composite, it is preferably a porous, absorptive support with high surface material area of from about 25 to about 500 $m^2/g$. The porous support should be relatively refractory to the conditions utilized in the reforming process. It is intended to include within the scope of our invention the use of support materials which have traditionally been utilized in hydrocarbon conversion catalysts such as, for example; (1) activated carbon, coke, or charcoal; (2) silica or silica gel, silicon carbide, clays, and silicates including those synthetically prepared and naturally occurring, which may or may not be acid treated, for example, attapulgus clay, china clay, diatomaceous earth, fuller's earth, kaolin, kieselguhr, etc.; (3) ceramics, porcelain, crushed firebrick, bauxite; (4) refractory inorganic oxides such as alumina, titanium dioxide, zirconium dioxide, chromium oxide, beryllium oxide, vanadium oxide, cesium oxide, hafnium oxide, zinc oxide, magnesia, boria, thoria, silica-alumina, silica-magnesia, chromia-alumina, alumina-boria, silica-zirconia, etc.; (5) crystalline zeolitic alumina-silicates such as naturally occurring or synthetically prepared mordenite, faujasite or other zeolites, either in the hydrogen form or in a form which has been exchanged with metal cations; (6) spinels such as $MgAl_2O_4$, $FeAl_2O_4$, $ZnAl_2O_4$, $CaAl_2O_4$, and other like compounds having the formula $MO-Al_2O_3$ where M is a metal having a valence of 2; and (7) combinations of materials from one or more of these groups. The preferred support material for our catalyst is alumina, especially gamma- or eta-alumina.

The preferred alumina support material may be prepared in any suitable manner from synthetically prepared or naturally occurring raw materials. The support may be formed in any desired shape such as spheres, pills, cakes, extrudates, powders, granules, etc., and it may be utilized in any particle size. One preferred shape of alumina is the sphere. Another preferred shape of alumina is the cylinder. A preferred particle size is about 1/16 inch in diameter, though particles as small as about 1/32 inch, and smaller, may also be utilized.

To make alumina spheres aluminum is converted into an alumina sol by reacting aluminum powder with a suitable peptizing acid and water, and then dropping a mixture of the resulting sol and a gelling agent into an oil bath to form spherical particles of an alumina gel which are easily converted into the gamma-alumina support material by known methods including aging, drying and calcining. To make alumina cylinders, an alumina powder is mixed with water and a suitable peptizing agent such as nitric acid, for example, until an extrudable dough is formed. The dough is then extruded through a suitably sized die to form extrudate particles. Other shapes of the alumina support material may also be prepared by conventional methods. After the alumina particles are shaped generally they are dried and calcined. The alumina support material may be subjected to intermediate treatments during its preparation, including washing with water or contacting with ammonium hydroxide, for example, or with other compounds, but these treatments are generally well-known in the art, and besides, they are not critical to the preparation of our new catalyst. Other catalyst components, including catalyst modifiers discussed above, may be added to the preferred alumina carrier material during or after its preparation.

Preferably the catalyst composite of our invention also contains a halogen component. The halogen component may be either fluorine, chlorine, bromine or iodine or mixtures thereof. Chlorine and bromine are the preferred halogen components. The halogen component is generally present, we believe, in a combined state with the porous support material. Preferably the halogen component is also well dispersed throughout the catalyst composite. The halogen component generally will comprise about 0.01 wt. % to about 15 wt. %, on an elemental basis, of the final catalyst composite. Preferably the catalyst comprises about 1.0 wt. % chlorine.

The halogen component may be added to the support material in any suitable manner, either during the preparation of the support or before, while or after the other catalyst components are incorporated. For example, the alumina hydrosol utilized to form the preferred alumina support material may contain halogen and thus contribute at least some portion of the halogen content in the final catalyst composite. Also, the halogen component or a portion thereof may be added to the catalyst composite during the incorporation of the support material with another catalyst component, for example, by using chloroplatinic acid to impregnate the platinum component. Also, the halogen component may be added to the catalyst composite by contacting the catalyst with the halogen or a compound, solution or suspension containing the halogen after the other catalyst components have been incorporated with the support material. Suitable compounds containing the halogen include, for example, acids containing the halogen such as hydrochloric acid and the like. Or, the halogen component may also be incorporated by contacting the catalyst with the halogen or a compound, solution or suspension containing the halogen in a subsequent regeneration step. In the regeneration step carbon deposited on the catalyst as coke during use of the catalyst in the reforming process is burned off the catalyst and the agglomerated platinum group component on the catalyst is redistributed to provide a regenerated catalyst with performance characteristics much like the fresh catalyst. The halogen component may be added during the carbon burn step or during the platinum group component redistribution step, for example, by contacting the catalyst with hydrogen chloride gas. Also the halogen component may be added to the catalyst composite by adding the halogen or a compound, solution or suspension containing the halogen, such as propylene dichloride, for example, to the hydrocarbon feed stream or to the process recycle gas during operation of the reforming process.

Optionally the catalyst composite of our invention can also contain a sulfur component. Generally the sulfur component will comprise about 0.01 to about 10 wt. %, calculated on an elemental basis, of the final catalyst composite. The sulfur component may be incorporated into the catalytic composite in any suitable manner. Preferably sulfur or a compound containing sulfur such as hydrogen sulfide, for example, is contacted with the catalyst composite in the presence of nitrogen at ambient temperature, preferably under water-free conditions, to incorporate the sulfur component.

After the platinum group component has been combined with the porous support material, the porous support material and platinum group component composite generally will be dried at a temperature of about 200° to about 400° F. for about 1 to about 24 hours or more, and then calcined or oxidized at a temperature of about 600° to about 1200° F. or more in an air or oxygen atmosphere for about 0.5 to about 10 hours in order to convert substantially all of the platinum group component to the oxide or oxyhalide form. When a halogen component is utilized in the catalyst, the halogen content of the catalyst composite is best adjusted during the oxidation step by including a halogen or halogen-containing compound such as hydrochloric acid, for example, in the air or oxygen oxidizing environment. In particular, when the halogen component of the catalyst is chlorine it is preferred to use a mole ratio of water to chlorine of about 5:1 to about 100:1 in air during at least a portion of the calcination step in order to adjust the final chlorine content of the catalyst composite to a range of from about 0.1 to about 5 wt. %. Preferably the duration of this halogenation step is about 1 to 5 hours.

The calcined or oxidized catalyst composite is then preferably subjected to a reduction step prior to incorporating the phosphorous component. This reduction step is designed to reduce the platinum group to the elemental metallic state and to ensure a uniform and finaally divided dispersion of it throughout the support material. Preferably a substantially pure and dry hydrogen stream is used as the reducing agent in this step. The reducing agent is contacted with the catalyst at conditions including a reduction temperature of about 400° to about 1200° F., a GHSV of about 10 to 10,000, sufficient to rapidly dissipate any local concentrations of water formed during the reduction step, for about 0.5 to 10 hours, effective to reduce substantially all of the platinum group components to the elemental metallic state.

Then the phosphorous component is incorporated with the porous support material and platinum group component composite in any suitable manner as discussed above. Afterwards, the phosphorus-containing composite may be dried. Then, the phosphorus-containing composite is reduced without an intermediate oxidation step.

For the purposes of this application "drying" means contacting the catalyst composite with an environment at a temperature intended to make the composite more free from water or fluid. For example, after the phosphorous component has been impregnated on the composite from an aqueous solution of hypophosphorous acid, the composite is dried in air at about 225° F. to evaporate the excess impregnation solution. "Oxidizing", on the other hand, means contacting the catalyst composite with an environment at a temperature intended to increase the oxidation state of a catalyst component. For example, after the platinum group component has been impregnated on the porous support material, the composite is oxidized in air at about 975° F. to convert substantially all of the platinum group component to the oxide form. "Reducing" means contacting the catalyst composite with an environment at a temperature intended to decrease the oxidation state of a catalyst component. For example, after the platinum group component has been impregnated on the composite and oxidized, the composite is reduced in dry hydrogen at about 1050° F. to convert the oxide form of the platinum group component to the metallic or elemental form.

According to the process of this invention the hydrocarbon chargestock is contacted with the catalyst composition of this invention in a hydrocarbon conversion zone. This contacting may be accomplished with the catalyst being in a fixed, moving, ebullated or fluidized type catalyst bed, either in a continuous or a batch type operation, with either continuous or batch type regenerations of the catalyst between operational cycles. The hydrocarbon conversion zone may be one or more separate reactors, and the hydrocarbons may be contacted with the catalyst bed in an upward, downward or radial flow type fashion. The hydrocarbons may be in either the liquid, mixed liquid-vapor or vapor phase when they contact the catalyst.

The catalyst composition of this invention is best used for reforming hydrocarbons boiling in the gasoline range. For reforming operations where the reactions of dehydrogenation, dehydrocyclization, hydrocracking and isomerization occur simultaneously to varying extents, the preferred catalyst composition of this invention comprises, on an elemental basis, about 0.01 to about 5 wt. % platinum group component, about 0.01 to about 5 wt. % phosphorus and about 0.01 to about 5 wt. % chlorine on alumina. Best results have been obtained with a catalyst comprising about 0.4 wt. % platinum, about 0.5 wt. % phosphorus and about 1.0 wt. % chlorine on gamma-alumina.

In a reforming process the hydrocarbon chargestock and hydrogen are contacted with the catalyst in a reforming zone at a temperature of about 500° to about 1100° F., a pressure of about 50 to about 1000 psig, an LHSV of about 0.1 to about 10 hr.$^{-1}$, and a mole ratio of hydrogen to hydrocarbon of about 0.5:1 to about 20:1. Preferably the pressure is about 50 to about 450 psig. For reforming operations it is generally preferred to maintain the reforming zone substantially water-free, that is, with less than 20 ppm, and preferably less than 5 ppm, calculated as weight of water in the chargestock, entering the reforming zone from any source. The reforming zone may be one or more separate reactors with suitable heat exchange means therebetween to maintain the desired temperature at the inlet to each reactor. The effluent stream from the reforming zone is generally passed through a cooling means to a separation zone, typically maintained at about 25° to 150° F., wherein a hydrogen-rich gas stream is separated from the high octane or high aromatics content liquid product stream, commonly called an unstabilized reformate. The separated hydrogen stream may be recycled back to the reforming zone or utilized in other refinery processes, or both. The unstabilized reformate is typically passed to a fractionation zone wherein a stabilized reformate is recovered as the product of the reforming process.

The hydrocarbon charged to the reforming zone will comprise hydrocarbons, including naphthenes and paraffins, boiling in the gasoline range. Suitable chargestocks include straight run or natural gasolines, thermally or catalytically cracked gasolines, synthetic gasolines, partially reformed gasolines, and the like. The hydrocarbon chargestock may be a full boiling gasoline having an initial boiling point of from about 50° F. to about 150° F. and an end boiling point of from about 325° F. to about 425° F. The chargestock may be pure hydrocarbons or mixtures thereof. Also, the chargestock may be pretreated by conventional methods such as by hydrotreating, including hydrodesulfurization and the like, to remove substantially all sulfurous, nitrogeneous, and other types of contaminants therefrom or to saturate any olefins therein.

The catalyst of this invention may be utilized also for catalyzing many reactions besides the reforming reactions discussed above, including, for example, alkylation, de-alkylation, trans-alkylation, cracking, cyclization, denitrogenation, desulfurization, hydrogenation, hydrogenolysis and polymerization reactions.

For dehydrocyclizing operations the preferred catalyst composition of this invention also comprises, on an elemental basis, about 0.01 to about 5 wt. % platinum group component, about 0.01 to about 5 wt. % phosphorus and about 0.01 to about 5 wt. % chlorine on alumina. In one dehydrocyclization process paraffins are converted to aromatics, for example, normal heptane is converted to toluene and normal decane is converted to tetramethylbenzene. Dehydrocyclizing conditions include a temperature of about 800° to about 1000° F., a pressure of about 0 to about 1000 psig, an LHSV of about 0.1 to about 10 hr.$^{-1}$ and a mole ratio of hydrogen to hydrocarbon of about 0.5:1 to about 20:1.

For dehydrogenating operations the preferred catalyst composition of this invention will comprise, on an elemental basis, about 0.01 to about 5 wt. % platinum group component, about 0.01 to about 5 wt. % phosphorus and about 0.01 to about 15 wt. % alkali or alkaline earth component on alumina. The alkali or alkaline earth component may be selected from the group of cesium, rubidium, potassium, sodium and lithium or from the group of barium, strontium, calcium and magnesium or mixtures of metals from either or both of these groups. The alkali or alkaline earth component may be incorporated with the catalyst composite in any conventional manner, with impregnation of it from an aqueous solution or suspension of a decomposable compound of the alkali or alkaline earth component being preferred. In a dehydrogenation process naphthenes are dehydrogenated to aromatics and normal paraffins are dehydrogenated to the corresponding normal olefins. Dehydrogenation conditions include a temperature of about 700° to about 1250° F., a pressure of about 0 to about 1000 psig, an LHSV of about 1 to about 40 hr.$^{-1}$ and higher, and a hydrogen to hydrocarbon mole ratio of about 1:1 to about 20:1.

For hydrocracking and isomerizing operations the preferred catalyst composition of this invention comprises, on an elemental basis, about 0.01 to about 5 wt. % platinum group component, about 0.01 to about 5 wt. % phosphorus, and about 0.01 to about 15 wt. % chlorine on alumina, with about 5 wt. % chlorine being especially preferred. Additionally, for hydrocracking and isomerizing operations the catalyst composition of this invention may also include a Friedel-Crafts metal halide component. Suitable metal halides of the Friedel-Crafts type include aluminum chloride, aluminum bromide, ferric chloride, ferric bromide, zinc chloride and the like compounds with alumina chloride being preferred. The Friedel-Crafts component may be utilized in any catalytically effective amount and may be incorporated with the catalyst composite in any conventional method. In hydrocracking operations high boiling paraffins, for example, are split and hydrogenated to lower boiling paraffins. In isomerizing operations, normal paraffins, for example, are isomerized to the corresponding isoparaffins. Hydrocracking conditions include a temperature of about 400° to about 900° F., a pressure of about 500 psig to about 3000 psig, an LHSV of about 0.1 to about 10 hr.$^{-1}$ and hydrogen circulation rates of about 1000 to about 20,000 standard cubic feet per barrel of charge. Isomerization conditions include a temperature of about 32° to about 1000° F., a pressure of about 0 to about 1500 psig, an LHSV of about 0.2 to about 10 hr.$^{-1}$ and a hydrogen to hydrocarbon mole ratio of about 0.5:1 to about 20:1.

The following worked Examples are introduced to describe further the catalyst of our invention, and to teach one skilled in the art how to make it and how to use it in a hydrocarbon conversion process of our invention. These Examples represent some preferred embodiments of our invention, and are intended to be illustrative only and not restrictive.

EXAMPLE I

An alumina support material comprising 1/16 inch spheres was prepared by: forming an alumina hydrosol by dissolving substantially pure aluminum pellets in a hydrochloric acid solution, adding hexamethylenetetramine to the alumina sol, gelling the resulting solution by dropping it into an oil bath to form spherical particles of an alumina hydrogel, aging and washing the resulting particles, and finally drying and calcining the aged and washed spheres to form spherical gamma-alumina particles containing about 0.3 wt. % combined chloride. Additional details as to this method of preparing the alumina support material are given in the teachings of U.S. Pat. No. 2,620,314.

An alumina support material containing 0.5 wt. % phosphorus was similarly prepared except hypophosphorous acid was also added to the alumina sol prior to gelling the support material.

Five different platinum-containing reforming catalysts were then prepared by contacting these support materials with different impregnation solutions. One of the impregnation solutions contained chloroplatinic acid and hydrochloric acid. Another contained chloroplatinic acid, hydrochloric acid and hypophosphorous acid. Still another impregnation solution contained hypophosphorous acid.

Catalyst "A" contained 0.275 wt. % platinum and 0.98 wt. % chlorine. It was prepared by contacting the alumina support material with the chloroplatinic acid and hydrochloric acid impregnation solution with constant agitation. The amount of the platinum component contained in this impregnation solution was calculated to result in a final composite containing, on an elemental basis, about 0.275 wt. % platinum. In order to ensure uniform distribution of the platinum component throughout the support material, the amount of hydrochloric acid used was about 2 wt. % of the alumina particles. Additionally, the volume of the impregnation solution was approximately the same as the bulk volume of the support material particles so that all of the particles were immersed in the impregnation solution. The impregnation solution was maintained in contact with the support material particles for about ½ to about 3 hours at a temperature of about 70° F. Thereafter, the temperature of the impregnation solution was raised to about 225° F. and the excess solution was evaporated in about 2 to 3 hours. The resulting dried impregnated particles were then subjected to an oxidation step in a dry air stream at a temperature of about 975° F. and a GHSV of about 500 hr.$^{-1}$ for about ½ hour. This oxidation step was intended to convert substantially all of the platinum to the oxide form. The resulting oxidized particles were subsequently contacted in a halogen-treating step with a sulfur-free air stream containing water and HCl in a mole ratio of about 30:1 for about 2 hours at 975° F., and a GHSV of about 500 hr.$^{-1}$ in order to adjust the halogen content of the catalyst composite to a value of about 1.0 wt. %. The halogen-treated particles were thereafter subjected to a second oxidation step with a dry air stream at 975° F. and a GHSV of 500 hr.$^{-1}$ for an additional period of about ½ hour. The oxidized and halogen-treated catalyst particles were then subjected to a dry reduction step, designed to reduce the platinum to the elemental state, by contacting them for about 1 hour with a dry hydrogen stream containing less than 5 vol. ppm water at a temperature of about 1050° F., a pressure slightly above atmospheric and a flow rate of the hydrogen stream through the catalyst particles corresponding to a GHSV of about 400 hr.$^{-1}$.

Catalyst "B" contained 0.275 wt. % platinum, 0.91 wt. % chlorine and 0.5 wt. % phosphorus. This catalyst was prepared in the same manner as Catalyst "A" above except the alumina support material was contacted with the impregnation solution containing chloroplatinic acid, hydrochloric acid and hypophosphorous acid so the platinum group component and the phosphorous component were composited together with the porous support material. After the impregnation step the catalyst particles were dried, oxidized and reduced according to the techniques discussed above.

Catalyst "C" contained 0.275 wt. % platinum, 0.92 wt. % chlorine and 0.5 wt. % phosphorus. This catalyst was prepared in the same manner as Catalyst "A" above except the alumina support material was first contacted with the impregnation solution containing hypophosphorous acid. The amount of the phosphorous component contained in this impregnation solution was calculated to result in a final catalyst composite containing, on an elemental basis, about 0.5 wt. % phosphorus. This impregnation step was performed by adding the alumina support material particles to the impregnation solution in a nitrogen atmosphere with constant agitation. The impregnation solution was maintained in contact with the particles for about 1 hour at a temperature of about 70° F. Thereafter the temperature of the impregnation solution was raised to about 225° F. and the excess solution was evaporated in about 1 hour. The resulting dried catalyst particles were then subjected to a reduction step in a substantially dry and pure hydrogen stream at a temperature of about 975° F. for about 1 hour. Then, the catalyst particles were contacted with the impregnation solution containing chloroplatinic acid and hydrochloric acid to incorporate the platinum component in the manner discussed above. So, for this catalyst, the phosphorous component was composited first and then the platinum group component was composited with the phosphorus-containing porous support material.

Catalyst "D", representing an embodiment of our invention, contained 0.275 wt. % platinum, 0.91 wt. % chlorine and 0.5 wt. % phosphorus. This catalyst was prepared by first impregnating the platinum component in the manner discussed above for Catalyst "A", drying, oxidizing and reducing the catalyst composite and then impregnating the phosphorous component in the manner discussed above for Catalyst "C", and then drying and rereducing the final catalyst composite. For the catalyst of our invention, then, the platinum group component was composited first and then the phosphorous component was composited with the porous support material and platinum group composite.

Catalyst "E" contained 0.275 wt. % platinum, 1.04 wt. % chlorine and 0.5 wt. % phosphorus. This catalyst was prepared by contacting the alumina support containing about 0.5 wt. % phosphorus with the chloroplatinic acid and hydrochloric acid impregnation solution, drying, oxidizing and then reducing the final catalyst composite as for Catalyst "A". So, for this catalyst, the phosphorous component was composited while the porous support material was being prepared and then the platinum group component was composited with the phosphorus-containing support material.

These catalysts were then separately tested to determine their relative activity and selectivity characteristics in a process for reforming a light Arabian naphtha charge stock, an analysis of which is presented in Table I.

TABLE I

| Analysis of Charge Stock | |
|---|---|
| Gravity, °API at 60° F. | 59.0 |
| Specific Gravity at 60° F. | 0.743 |
| Distillation Profile, °F. | |
| Initial Boiling Point | 225 |
| 10% Boiling Point | 239 |
| 30% Boiling Point | 256 |
| 50% Boiling Point | 275 |
| 70% Boiling Point | 300 |
| 90% Boiling Point | 326 |
| End Boiling Point | 353 |
| Chloride Content, wt. ppm | <0.10 |
| Nitrogen Content, wt. ppm | 0.2 |
| Sulfur Content, wt. ppm | 0.3 |
| Water Content, wt. ppm | 6.0 |
| Research Octane Number | 31.0 |
| Paraffins, wt. % | 67.0 |
| Naphthenes, wt. % | 26.0 |
| Aromatics, wt. % | 7.0 |

These tests were each performed at identical conditions which included a reactor heater temperature which was adjusted to achieve and maintain a target $C_5+$ reformate product research octane number of 101.5, a pressure of 300 psig and LHSV of 2.5 hr.$^{-1}$ and a 4:1 hydrogen to hydrocarbon mole ratio. All tests were performed in a pilot-plant-scale reforming unit comprising a reactor containing a fixed catalyst bed, a hydrogen separation zone, a debutanizer column, suitable heating and condensing means, suitable pumping and compressing means and the like conventional pilot plant equipment. In this plant a hydrogen recycle stream is commingled with the charge stock and the resulting mixture is heated to the desired conversion temperature. The heated mixture is passed downflow through the reactor containing the catalyst undergoing evaluation. An effluent stream is withdrawn from the bottom of the reactor, cooled to about 55° F. and passed to a hydrogen separation zone wherein a hydrogen-rich gaseous phase is separated from a liquid hydrocarbon phase. A portion of the gaseous phase is continuously passed through a high-surface-area sodium scrubber and the resulting substantially sulfur-free and water-free hydrogen stream is returned to the reactor as the hydrogen recycle stream. Excess gaseous phase from the hydrogen separation zone is recovered as a hydrogen-rich product stream. The liquid phase from the separation zone is withdrawn therefrom and passed to a debutanizer column wherein light gaseous products including $C_1$ to $C_4$ hydrocarbons are taken overhead as debutanizer gas and $C_5+$ hydrocarbons are recovered from the debutanizer bottoms as the high aromatics content reformate product.

The results of the separate tests performed on the catalyst of our invention, Catalyst "D", and the four control catalysts, Catalyst "A", "B", "C", and "E", are presented in Table II.

TABLE II

| Catalyst | Reforming Test Results | | | | |
|---|---|---|---|---|---|
| | A | B | C | D | E |
| Conversion Temperature, °F.* | 981 | 995 | 986 | 1005 | 981 |
| $C_5+$ Yield, LV %* | 69.8 | 69.1 | 68.6 | 71.3 | 68.7 |
| Hydrogen Produced, SCFB* | 978 | 1020 | 997 | 1184 | 983 |

*at 0.3 barrels of charge stock per pound of catalyst life

From Table II it is apparent that Catalyst "D" of our invention exhibits substantially higher selectivity, represented by the higher $C_5+$ yield for the test, than the control catalysts. Also, the Catalyst "D" of our invention produced more hydrogen, in standard cubic feet of hydrogen per barrel of charge stock, than the control catalysts.

EXAMPLE II

We studied the effect of the amount of phosphorous component relative to the amount of platinum group component on catalysts of our invention. Four catalysts were prepared. Catalyst "F" contained 0.275 wt. % platinum, about 1.1 wt. % chlorine and 0.060 wt. % sulfur. This catalyst was prepared in the same manner as Catalyst "A" above except the platinum component impregnation solution was contacted with the alumina support material under vacuum. Then the catalyst composite was dried, oxidized, halogen-treated and reduced like Catalyst "A" and the additional sulfur component was incorporated by contacting the reduced catalyst with hydrogen sulfide in dry nitrogen at ambient temperature. Catalysts "G", "H" and "I", representing embodiments of our invention, were prepared like Catalyst "F" except different amounts of phosphorous component from aqueous impregnation solutions of hypophosphorous acid were added to these catalysts instead of the sulfur component. Catalyst "G" contained 0.275 wt. % platinum, about 1.1 wt. % chlorine and 0.05 wt. % phosphorus. The phosphorus to platinum atomic ratio for this catalyst was 1.1. Catalyst "H" contained the same amounts of components as Catalyst "G" except it contained 0.28 wt. % instead of 0.05 wt. % phosphorus. The phosphorus to platinum atomic ratio for this catalyst was 6.4. Catalyst "I" also contained the same amounts of components except it contained 0.45 wt. % phosphorus. The phosphorus to platinum atomic ratio for this catalyst was 10.3.

These catalysts were then separately tested in the same manner as the catalyst ins Example I except the target octane number for these tests was 100.0 instead of 101.5. The results of the reforming tests are presented in Table III.

TABLE III

| | Reforming Test Results | | | |
|---|---|---|---|---|
| Catalyst | F | G | H | I |
| Conversion Temperature, °F.* | 964 | 963 | 970 | 980 |
| $C_5+$ Yield, LV %* | 70.7 | 73.3 | 73.4 | 72.5 |
| Hydrogen Produced, SCFB* | 941 | 1030 | 1052 | 1057 |

*at 0.3 barrels of charge stock per pound of catalyst life

From Table III it is apparent that Catalysts "G", "H" and "I" of our invention exhibit substantially higher selectivity as represented by the higher $C_5+$ yields for the test. Also, these catalysts of our invention produced more hydrogen, in standard cubic feet per barrel of charge stock, than the other catalyst. Furthermore, at the phosphorous levels tested, the advantages of our catalysts do not appear to be a strong function of the phosphorus to platinum group component atomic ratio.

EXAMPLE III

Also, we studied the effects on several phosphorus-containing catalysts of our invention of oxidation and reduction steps after the phosphorus incorporation step. Three catalysts were prepared. Catalyst "J" contained 0.3 wt. % platinum and about 1.0 wt. % chlorine. This catalyst was prepared in the same manner as Catalyst "A" above. Catalyst "K" contained 0.3 wt. % platinum, about 1.0 wt. % chlorine, and 0.04 wt. % phosphorus. This catalyst was prepared in the same manner as Catalyst "J" except phosphorus was added to the oxidized and reduced platinum-containing composite from an impregnation solution of triphenylphosphine and benzene. Then, that composite was dried, oxidized in 1728 GHSV of air at about 1000° F. for about 2½ hours and reduced in 1440 GHSV of dry hydrogen at about 1050° F. for about 1 hour. Catalyst "L", representing an embodiment of our invention, also contained 0.3 wt. % platinum, about 1.0 wt. % chlorine and 0.04 wt. % phosphorus. This catalyst was prepared in the same manner as Catalyst "K" except after the phosphorus was added the composite was dried and then reduced, without an intermediate oxidation step, in 1440 GHSV of dry hydrogen at about 1050° F. for about 1 hour.

These catalysts were then separately tested in the same manner as the catalysts in Example I. The results of the reforming tests are presented in Table IV.

TABLE IV

| | Reforming Test Results | | |
|---|---|---|---|
| Catalyst | J | K | L |
| Conversion Temperature, °F.* | 958 | 968 | 971 |
| $C_5+$ Yield, LV %* | 69.9 | 69.1 | 71.7 |
| Hydrogen Produced, SCFB* | 830 | 791 | 955 |

*at 0.4 barrels of charge stock per pound of catalyst life

From Table IV it is apparent that Catalyst "L" of our invention exhibits substantially higher selectivity as represented by the higher $C_5+$ yield for the test. Also, the Catalyst "L" of our invention produced more hydrogen, in standard cubic feet per barrel of charge stock, than the other catalysts.

Summarily, it is clear from the data presented in Tables II, III and IV that a catalyst composite comprising a platinum group component, a phosphorous component and a porous support material, said catalyst being made by the method of our invention, provides a reforming catalyst with improved selectivity and hydrogen production characteristics.

What we claim is:
1. A catalyst comprising a platinum group component, a phosphorous component and a porous support material, said catalyst being made by the method of
   (a) compositing a platinum group component with a porous support material,
   (b) contacting the composite from step (a) with phosphorus or a compound of phosphorus at a temperature less than 700° F. so that the phosphorus to platinum group component atomic ratio is greater than 0.5, and
   (c) then reducing the composite from step (b) to decrease the oxidation state of a catalyst component without an intermediate oxidation step.
2. The catalyst of claim 1 wherein the platinum group component is platinum.
3. The catalyst of claim 2 which comprises about 0.01 to about 5 wt. % platinum.
4. The catalyst of claim 1 which comprises about 0.01 to about 5 wt. % phosphorus.
5. The catalyst of claim 1 wherein the porous support material is alumina.
6. The catalyst of claim 1 which also comprises a halogen component.
7. The catalyst of claim 6 wherein the halogen component is a chlorine component.
8. The catalyst of claim 7 which comprises about 0.01 to about 15 wt. % chlorine.
9. The catalyst of claim 1 which also comprises a sulfur component.
10. The catalyst of claim 9 wherein the catalyst comprises, on an elemental basis, about 0.01 to about 10 wt. % sulfur.
11. A method for making a catalyst which comprises the steps of
    (a) compositing a platinum group component with a pourous support material,
    (b) contacting the composite from step (a) with phosphorus or a compound of phosphorus at a temperature less than 700° F. so that the phosphorus to platinum group component atomic ratio is greater than 0.5, and
    (c) then reducing the composite from step (b) to decrease the oxidation state of a catalyst component without an intermediate oxidation step.
12. The method of claim 11 wherein the platinum group component is a platinum component.
13. The method of claim 12 wherein the platinum component is chloroplatinic acid.
14. The method of claim 13 wherein the porous support material is commingled with an aqueous solution of chloroplatinic acid.
15. The method of claim 11 wherein the porous support material is alumina.
16. The method of claim 15 wherein the alumina contains combined halogen.
17. The method of claim 11 wherein the composite from step (a) is oxidized before step (b).
18. The method of claim 11 wherein the composite from step (a) is reduced before step (b).

19. The method of claim 11 wherein the composite from step (a) is oxidized then reduced from step (b).

20. The method of claim 11 wherein the porous support material and platinum group component composite is contacted with elemental phosphorus.

21. The method of claim 11 wherein the porous support material and platinum group component composite is contacted with a compound of phosphorus.

22. The method of claim 21 wherein the phosphorous compound is hypophosphorous acid.

23. The method of claim 21 wherein the phosphorous compound is phosphoric acid.

24. The method of claim 21 wherein the phosphorous compound is tributylphosphine oxide.

25. The method of claim 21 wherein the phosphorous compound is dimethlyphosphite.

26. The method of claim 21 wherein the phosphorous compound is triphenylphosphine.

27. The method of claim 21 wherein the phosphorous compound is cyclohexylphosphine.

28. The method of claim 21 wherein the phosphorous compound is phosphorous trichloride.

29. The method of claim 21 wherein the phosphorous compound is tributyl phosphite.

30. The method of claim 21 wherein the phosphorous compound is phosphorous tribromide.

31. The method of claim 21 wherein the phosphorous compound is phosphorous triiodide.

32. The method of claim 21 wherein the phosphorous compound is phosphorous oxychloride.

33. The method of claim 11 wherein the phosphorus to platinum atomic ratio is from about 0.5 to about 20.

34. The method of claim 11 wherein the composite from step (b) is reduced with a hydrogen stream at a temperature of about 400° to 1200° F. and a GHSV of about 10 to 10,000 for about 0.5 to 10 hours.

35. A method for making a catalyst which comprises the steps of
(a) compositing a platinum group component with a porous support material,
(b) drying, oxidizing and reducing the composite from step (a),
(c) contacting the composite from step (b) with phosphorus or a compound of phosphorus at a temperature less than 700° F. so that the phosphorus to platinum group component atomic ratio is greater than 0.5, and
(d) drying, and then reducing the composite from step (c) to decrease the oxidation state of a catalyst component without an intermediate oxidizing step.

* * * * *